US 6,532,665 B2

(12) United States Patent
Parker

(10) Patent No.: US 6,532,665 B2
(45) Date of Patent: Mar. 18, 2003

(54) METHOD FOR EXPANDING A COVER PLATE

(75) Inventor: Glen C. Parker, St. Peters, MO (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/681,305

(22) Filed: Mar. 15, 2001

(65) Prior Publication Data
US 2002/0129482 A1 Sep. 19, 2002

(51) Int. Cl.⁷ .................................................. B23P 11/00
(52) U.S. Cl. ........................... 29/898.051; 29/898.1; 29/441.1; 29/522.1; 29/283.5
(58) Field of Search ..................... 29/898.044, 898.1, 29/441.1, 451, 243.5, 283.5, 898.051, 522.1; 403/274, 279, 278, 280, 281, 282

(56) References Cited

U.S. PATENT DOCUMENTS

| | | |
|---|---|---|
| 1,507,840 A | 9/1924 | Landgraf |
| 3,055,086 A | 9/1962 | Hoganson |
| 3,318,645 A | 5/1967 | Sutowski |
| 3,602,980 A | 9/1971 | Heffner |
| 3,791,748 A | 2/1974 | Goodrich, Jr. et al. |
| 3,813,178 A | 5/1974 | Herbenar et al. |
| 3,857,149 A | 12/1974 | Hassan |
| 3,890,052 A | 6/1975 | Herbenar et al. |
| 3,909,920 A | 10/1975 | Cornish et al. |
| 3,958,411 A | 5/1976 | Bernt |
| 4,017,197 A | 4/1977 | Farrant |
| 4,070,121 A | 1/1978 | Graham |
| 4,163,617 A | 8/1979 | Nemoto |
| 4,389,766 A | 6/1983 | Capuano |
| 4,477,714 A | 10/1984 | Zorn et al. |
| 4,478,531 A | 10/1984 | Levinson et al. |
| 4,569,126 A | 2/1986 | Weber |
| 4,710,037 A | 12/1987 | Newberg |
| 4,723,350 A | 2/1988 | Kobayashi et al. |
| 4,749,299 A | 6/1988 | Swanson |
| 4,750,347 A * | 6/1988 | Saarinen .................. 29/243.53 |
| 4,783,985 A | 11/1988 | LaBarge et al. |
| 4,823,454 A | 4/1989 | Mills |
| 4,875,794 A | 10/1989 | Kern, Jr. |
| 5,127,156 A | 7/1992 | Yokoyama et al. |
| 5,155,897 A | 10/1992 | Schleicher |
| 5,509,749 A | 4/1996 | Eifert et al. |
| 5,517,743 A | 5/1996 | Liebig et al. |
| 5,885,022 A | 3/1999 | Maughan et al. |
| 6,125,541 A | 10/2000 | Parker |
| 6,202,280 B1 * | 3/2001 | Parker ....................... 29/441.1 |

FOREIGN PATENT DOCUMENTS

| | | | |
|---|---|---|---|
| DE | 2443089 B | * | 3/1976 |
| DE | 2163282 B | * | 2/1978 |

* cited by examiner

Primary Examiner—Gregory M. Vidovich
Assistant Examiner—Jermie E. Cozart
(74) Attorney, Agent, or Firm—Polster, Lieder, Woodruff & Lucchesi, L.C.

(57) ABSTRACT

An assembly technique and device for enclosing an open end of a movable socket (10) comprised of fully hardened materials with an expanding cover-plate (66) and for controlling the expansion of the cover-plate (66) to provide a central orifice (67) of predetermined dimensions to facilitate the installation of a grease fitting. During assembly, various internal components of the movable socket, including the pressure plate, are installed within a housing (12) through a posterior opening (16) with the cover-plate positioned over the components. A two-stage ram (100) having a contact surface and a concentric pivot punch (142, 158) is brought into engagement with the cover-plate. Pressure exerted by the two-stage ram is transferred to the cover-plate through the contact surface, expanding the cover-plate to conform to the contact surface and enclosing the internal components within the socket housing. The exerted pressure additionally results in the extension of the concentric pivot punch into the central orifice of the cover-plate, controlling the expansion of the cover-plate and establishing the central orifice to predetermined dimensions upon closure of the socket housing.

6 Claims, 5 Drawing Sheets

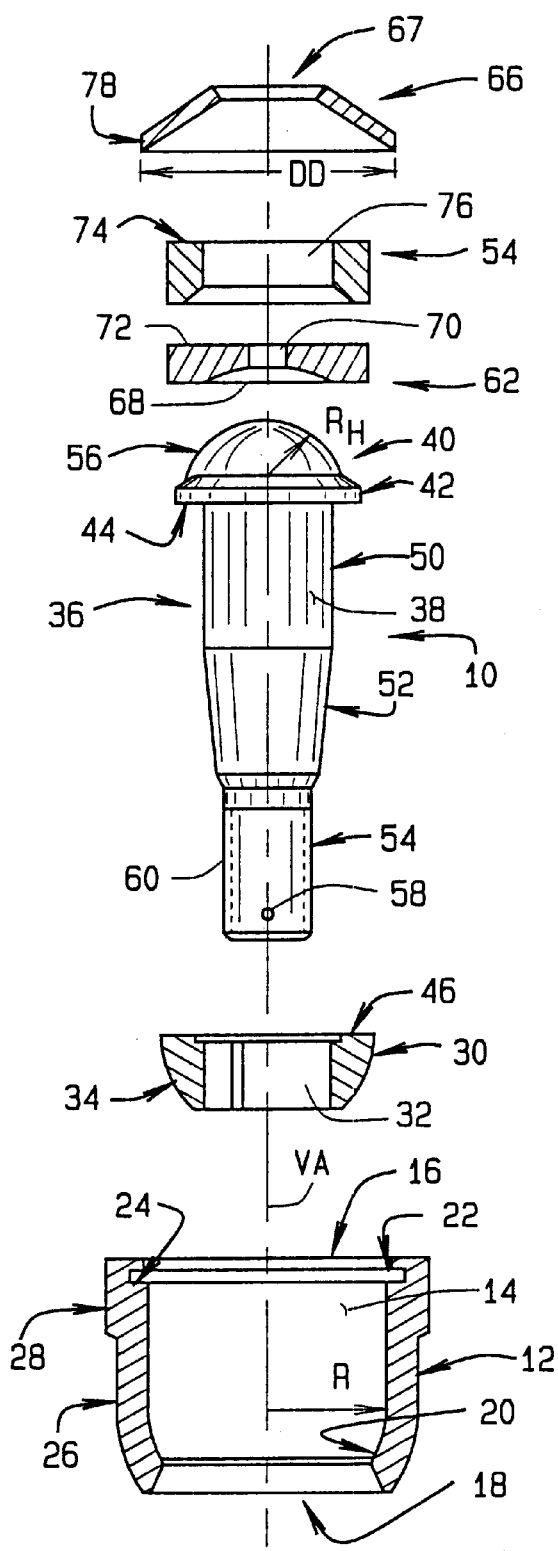
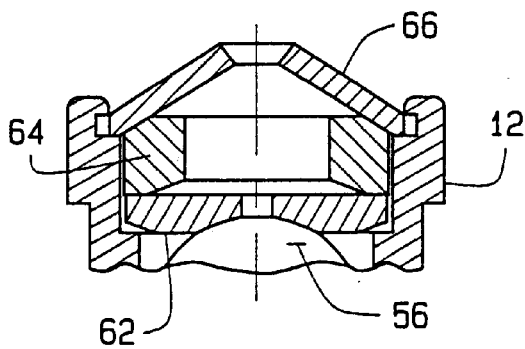
FIG. 2
FIG. 3

METHOD FOR EXPANDING A COVER PLATE

BACKGROUND OF INVENTION

This invention relates to the manufacturing and assembly of movable sockets, for example, ball-joints as used in automotive steering and suspension systems, and more particularly, to a method and device for performing dual operations of closing one end of a movable socket without spinning, swaging, or welding, by means of an expanding cover-plate, and for producing a centrally located orifice of predetermined size in the cover-plate. While the invention is described in detail with respect to automotive applications, those skilled in the art will recognize the broader applicability of the invention.

Conventional ball-joints, and other movable sockets are used, for example, in automotive steering and suspension applications. The sockets comprise a housing having a circular cylindrical internal surface, a ball stud with a ball head contained in the housing, and a synthetic resin, heat treated steel, or sintered alloy bearing member supporting the ball head within the housing. These components are installed into the housing through a posterior opening, with the ball stud extending outward through an axially disposed anterior opening of a smaller diameter than the ball head. Traditionally, the posterior opening is closed by means of a cover-plate, which is spun or swaged in place, as seen in FIGS. 1A–1D. Alternatively, the cover-plate may be welded into place.

Cover-plate elements are traditionally formed from a stamping process, whereby individual components having desired dimensions are stamped from metal sheets. Either during the stamping process or in a subsequent manufacturing step, a raised boss may be drawn or stamped into the cover-plate, and a centrally located hole of predetermined dimensions punched therein to receive a self-tapping or threaded grease fitting.

Once secured in place, the cover-plate presses on the bearing member either directly or indirectly through a resilient rubber intermediate component and a pressure plate.

Bearing components within the housing, against which the ball head or moveable component is articulated, perform best when the housing material is fully hardened, as it is better able to withstand the stresses and frictional wear associated with movement of the bearing components. Accordingly, the use of hardened materials greatly extends the useful life of the bearing components and the housing. However, hardened material surfaces greatly hinder traditional spinning, swaging, or welding operations required to enclose the housing.

As described in co-pending U.S. patent application Ser. No. 09/167,917 filed on Oct. 7, 1998 now U.S. Pat. No. 6,202,280, (herein incorporated by reference) a method and device for expanding a conical or convex cover-plate within the posterior opening may be employed to secure and enclose the socket components within the socket housing, allowing for closure of a fully hardened housing without the need for traditional spinning, swaging, or welding operations.

Alternatively, as is described in U.S. Pat. No. 6,125,541 to Parker, herein incorporated by reference, a two-stage ram having first and second contact surfaces may be utilized to first expand a conical or convex wear-indicator style cover-plate within the posterior opening of a housing, and then to further deform the cover-plate to a predetermined final position relative to the internal components of the socket to provide a predetermined wear indicator distance. Once assembled, movable sockets may be utilized as load carrying members in numerous mechanical systems, including automotive vehicle suspension and steering systems. Obviously, movable sockets or ball-joints employed in these applications are subjected to various operating conditions, and may be required to carry substantial loads. When wear develops, the performance of the movable socket or ball-joint degrades and, in the case of automotive applications, may result in erratic steering or excessive looseness and play in the vehicle suspension system.

Accordingly, it is highly advantageous to develop a ram device capable of both expanding a conical or convex general-purpose cover-plate within a socket housing to enclose the housing without the need for specialized spinning, swaging, or welding operations. It is further highly advantageous to incorporate into the ram device, elements for establishing a desired cover-plate contour and a central orifice in the general-purpose cover-place of a predetermined size for the installation of a self-tapping grease fitting in a single machining operation.

SUMMARY OF INVENTION

Among the several objects and advantages of the present invention are:

The provision of an apparatus for expanding a conical or convex cover-plate to secure socket components within a socket housing and for establishing a central orifice in the cover-place of a predetermined size for the installation of a self-tapping grease fitting in a two-stage continuous operation;

The provision of the aforementioned apparatus wherein a contact surface expands the cover-plate within the housing, and an axially aligned pivot punch independently establishes a central orifice in the cover-place of a predetermined size for the installation of a self-tapping grease fitting;

The provision of the aforementioned apparatus wherein the contact surface is configured to expand the cover-plate within the housing and to produce a centrally located raised section or boss of predetermined height for clearance of internal socket components;

The provision of the aforementioned apparatus wherein the contact surface and the pivot punch are concentrically mounted within a ram housing;

The provision of the aforementioned apparatus wherein the pivot punch prevents the cover-plate from collapsing into a downward concave configuration during expansion;

The provision of the aforementioned apparatus wherein the pivot punch holds the cover-plate against the contact surface, forcing the cover-plate to conform to the surface configuration of the contact surface;

The provision of the aforementioned apparatus wherein the profile of the contact surface may be altered to numerous configurations ranging from flat to that which produces a centrally located raised section or boss in the cover-plate;

The provision of the aforementioned apparatus wherein the pivot punch includes an axial bore facilitating the injection of lubricant into the socket assembly in a single machining operation with the socket closing and orifice formation.

The provision of a method for use of the aforementioned apparatus wherein the cover-plate expansion operation and the cover-plate orifice establishing operation are integrated into a two-stage continuous pressing operation; The provision of the aforementioned method of use wherein the cover-plate expansion operation is a first stage operation, and the cover-plate orifice establishing operation is a second stage or sequential operation; and The provision of the aforementioned apparatus and method which simplifies the assembly and manufacture of movable sockets to close tolerances while providing minimal unit-to-unit variations.

Briefly stated, the present invention features an assembly technique for enclosing an open end of a movable socket comprised of fully hardened materials with an expanding cover-plate and for establishing a central orifice in the cover-place of a predetermined size for the installation of a self-tapping grease fitting. During assembly, various internal components of the movable socket, including a pressure plate, are installed within a housing through a posterior opening and a conical or convex cover-plate is positioned over the components within the posterior opening. A ram of the present invention having a contact surface is brought into engagement with the cover-plate. Pressure exerted by the ram is transferred to the cover-plate through the contact surface, expanding the cover-plate. As the pressure is exerted by the ram, a coaxially located pivot punch is extended through a central bore in the contact surface, and engages an inner edge of the cover-plate. Continued engagement between the contact surface, pivot punch, and the cover-plate results in the cover-plate conforming to the contour of the contact surface during the expansion process, enclosing the internal components within the socket housing. As the cover-plate expands, the engagement between the pivot punch and the inner edge of the cover-plate established a central orifice in the cover-plate of a predetermined size. Additionally, lubricants may be injected into the now closed socket through a central bore in the pivot punch.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification:

FIG. 2 is an exploded view of one illustrative embodiment of a movable socket assembly employing the expanding cover-plate of the present invention;

FIG. 3 is a partial view illustrating the movable socket of FIG. 2, with the upper end components in-place, prior to expansion of the cover-plate;

Corresponding reference numerals indicate corresponding parts throughout the several figures of the drawings.

DETAILED DESCRIPTION

Figure 1:
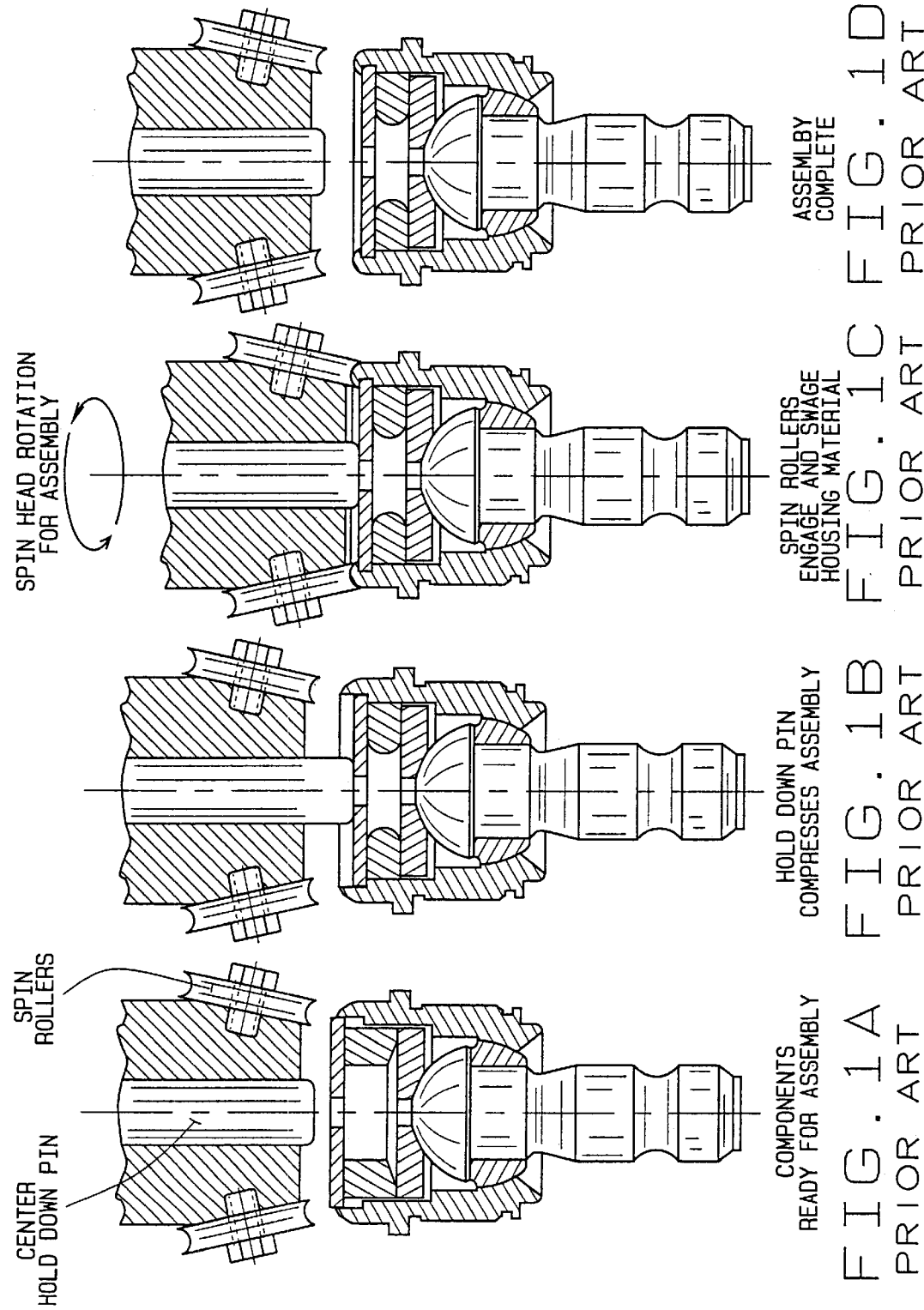
FIG. 1A is a sectional view of a prior art apparatus for spin and swagging closure of a socket assembly.
FIG. 1B is sectional view of the prior art apparatus of FIG. 1A compressing the components of a socket assembly.
FIG. 1C is a sectional view of the prior art apparatus of FIG. 1A engaging and swaging the housing material of the socket assembly to entrap the cover-plate.
FIG. 1D is a sectional view of the prior art apparatus of FIG. 1A upon completion of the socket closing procedure.

The following detailed description illustrates the invention by way of example and not by way of limitation. The description clearly enables one skilled in the art to make and use the invention, describes several embodiments, adaptations, variations, alternatives, and uses of the invention, including what we presently believe is the best mode of carrying out the invention.

Referring generally to FIGS. 2 and 3 the two-stage expanding cover-plate assembly method of the present invention may be used to enclose a movable socket, such as the ball-joint shown at 10, within a housing 12 without the need for spinning, swaging, or welding. Those skilled in the art will readily recognize the applicability of the following method to the assembly of a variety of different movable sockets; to facilitate the description of the method and devices used in conjunction therewith, the preferred embodiment of present invention is described in reference to a ball-joint 10, but is not limited to use therewith.

Housing 12, within which the various internal components of the ball-joint are enclosed, is generally cylindrical, with a central bore 14 of non-uniform radius having a posterior opening 16 and an anterior opening 18. The radius R of central bore 14 decreases to define a curved surface 20 at the base of the housing, adjacent anterior opening 18. A counterbore 22 having a circumferential groove 24 is formed in bore 14, adjacent the posterior opening 16. The exterior surface 26 of housing 12 may follow the general contour of the central bore 14. In the embodiment illustrated, the surface 26 has an expanded ridge 28 formed in it. The ridge 28 is used for attachment of ball-joint 10 to other components (not shown). As may be appreciated, the ridge 28 also may be adapted for other specific kinds of installations employing threads or other connectors (not shown).

To assemble ball-joint 10, a bearing 30 sized to fit within central bore 14 is seated within housing 12. The bearing 30 includes a central bore 32 axially aligned with a vertical axis VA of the housing, and a curved outer surface 34 of bearing 30 is designed to correspond to the curvature of surface 20 in housing 12.

Next, a stud 36 having a generally cylindrical body 38 and an enlarged head portion 40 with a circumferential flange 42 is passed through central bores 32 and 14, such that the underside 44 of flange 42 rests on an upper surface 46 of the bearing seated within the housing. The body 38 includes a uniform diameter upper portion 50 adjacent flange 42, a tapered central portion 52, and a lower portion 54 of a narrow uniform diameter. The upper portion 50 is sized to fit within the central bore 32 of bearing 30, with the central portion 52 and lower portion 54 extending through the anterior opening 18, externally of housing 12. The head portion 40 includes a hemispherical surface 56 with a radius Rh greater than that of upper portion 50, but less than radius R of the housing 12. When assembled, the hemispherical surface 56 and the curved outer surface 34 define a generally spherical unit within housing 12, allowing for conical movement of stud 36. Those skilled in the art will readily recognize that numerous shapes and configurations for stud 36 and bearing 30 are possible. For example, the stud 36 may include a generally spherical head, eliminating the need for bearing 30, or the cylindrical body may include threads (not shown), bores as at 58, or grooves as at 60, for attachment of external components (not shown).

Once stud 36 and bearing 30 are seated within the housing, a pressure plate 62 and a rubber cushion preload device 64 are placed within central bore 14, above hemispherical surface 56, and secured therein by an expanding cover-plate 66 having an axial bore 67 as described below. The pressure plate 62 sits on top of stud 36, and includes a curved indentation 68 having a radius of curvature corresponding to Rh. In the preferred embodiment, a lubrication port 70 is formed at the center of the pressure plate 62. Port 70 permits the injection of a lubricant into the interior spaces of the assembled ball-joint 10. The rubber cushion preload device 64 sits, in turn, on an upper surface 72 of pressure plate 62, and serves to hold the pressure plate 62 in place against the stud 36 while simultaneously permitting small movements in response to the conical movement of the stud. The rubber cushion preload device comprises a cylindrical body 74, having an axial passage 76 formed in it. Finally, cover-plate 66, shown in an un-expanded conical configuration in FIG. 2, is placed above the rubber cushion 64 adjacent counter-bore 22, for vertical compression and lateral expansion as will be described, to seat within circumferential groove 24 and enclose the various components within housing 12. To facilitate the insertion of the cover-plate 66 within the posterior opening of housing 12, the cover-plate 66 includes a circumferential rim 78 having and outer diameter OD sized to fit within counter-bore 22. FIG. 3 illustrates the arrangement of the ball-joint 10 upper components 36, 62, 64, and 66 prior to the expansion of the cover-plate 66.

As indicated above, those skilled in the art will recognize that the various internal components of the moveable socket secured within the housing 12 by the cover-plate 66 may be varied in size and shape depending upon the particular application for which the movable socket is designed, and accordingly, the above described ball-joint 10 is merely exemplary of one embodiment. The assembly method described co-pending U.S. patent application Ser. No. 09/167,917 for installing the expanding cover-plate 66 is applicable to any movable socket wherein one end of the housing 12 must be enclosed to retain internal components in place.

Figure 4:
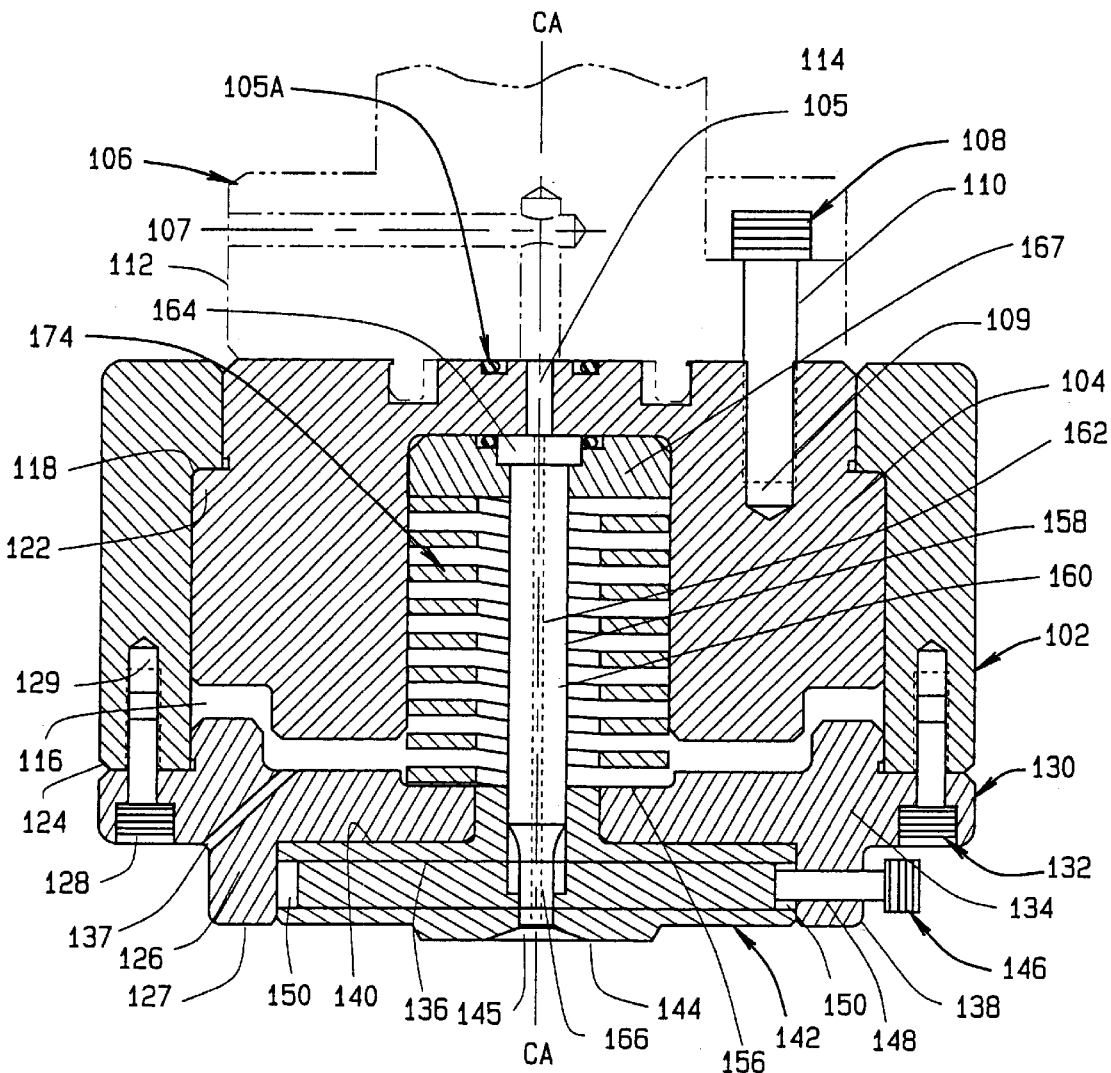
FIG. 4 is a sectional view of the two-stage assembly tool of the present invention.
Figure 5:
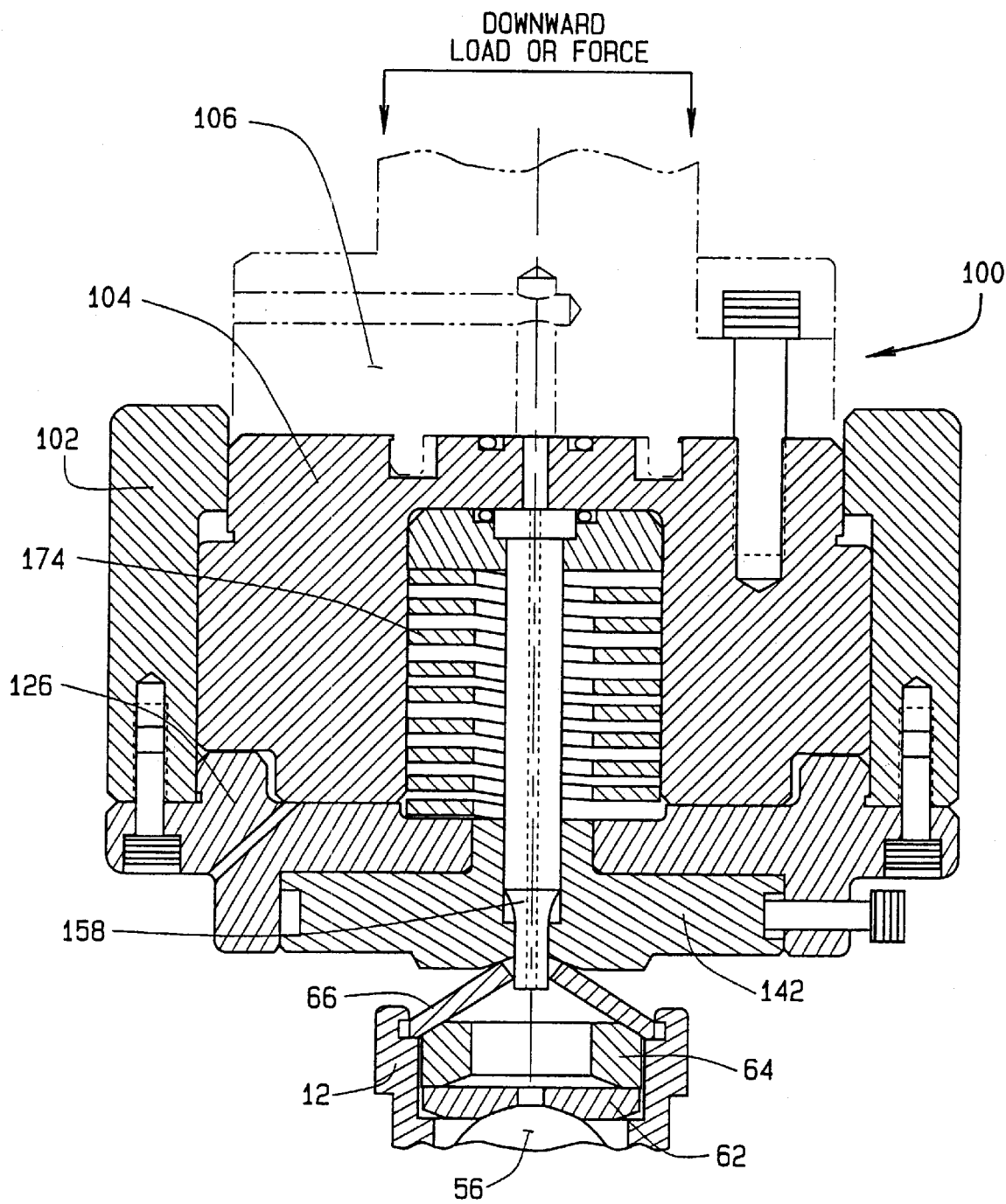
FIG. 5 is a section view similar to FIG. 4, illustrating the contact surface of a removable stop-out plate and a pivot punch in engagement with an unexpanded cover-plate of a ball-joint housing assembly.

Turning now to FIG. 4 and FIG. 5, an improved two-stage assembly tool or ram for use with the expanding cover-plate 66 is shown generally at 100. The two-stage assembly tool 100 comprises a cylindrical housing 102 having a central axis CA, mounted concentric to a housing adapter 104. Housing adapter 104 includes an axially aligned lubrication injection passage 105, surrounded by an O-ring seal 105A and is secured to a head adapter 106 by a number of retaining bolts 108 circumferentially spaced about the axis CA. Each retaining bolt 108 is secured to a threaded recess 109 in the housing adapter 104 through a threaded bore 110 in a circumferential flange 112 of the spin head adapter 106. In the preferred embodiment shown in FIGS. 4 and 5, the head adapter 106 is configured with an external surface 114 for attachment to the driving member of a hydraulic or pneumatic press (not shown), and the housing adapter 104 is secured to the spin head adapter 106 by three equidistantly spaced identical retaining bolts 108. The head adapter 106 further includes a lubrication injection port 107 aligned to delivery a lubricant flow to the axially aligned lubrication injection passage 105 in the housing adapter 104.

The cylindrical housing 102 of the two-stage assembly tool 100 includes a bore 116 concentric with the central axis CA and an inwardly-protruding circumferential shoulder 118 adjacent a posterior end 120 of bore 116. When assembled, the shoulder 118 seats against a circumferential flange 122 on the housing adapter 104, thereby retaining the housing portion 102 on the spin head adapter 106. The anterior end 124 of the housing 102 is enclosed by a mounting plate 126 secured to the housing portion 102 by a number of identical countersunk cap screws 128 threaded into recesses 129. In the preferred embodiment, a total of six socket-head cap screws 128 are equidistantly spaced about the circumference of the anterior end 124.

The mounting plate 126 comprises a torus body 127 having a rectangular cross-section, and is configured with a number of flanges for attachment of various components. First, an outer circumferential flange 130 extends radially outward from the body 127 to seat on the anterior end 124 of the housing 102. The flange 130 includes a number of identical countersunk threaded bores 132 through which the identical cap screws 128 pass into the housing 102. Those skilled in the art will recognize that the number of bores 132 corresponds to the number of cap screws 128 utilized in retaining the mounting plate 126 to the housing 102. Extending radially inward from the body 127, an inner circumferential flange 134 defines an axial passage 136 through the mounting plate 126. Additionally included within the body 127 are a number of ports 137, for the equalization of air-pressure within the two-stage assembly tool 100 and for the introduction of a lubricant thereto as required. Finally, a cylindrical flange 138 on the anterior surface of the body 127 defines a recessed mount 140 into which a removable stop-out plate 142 is secured.

As described in the co-pending U.S. patent application Ser. No. 09/167,917, stop-out plate 142, best shown in FIG. 4, and FIGS. 6A–6D includes a working face 144 configured to deform a conical or convex cover-plate 66 into a desired configuration and an enlarged axial bore 145. The stop-out plate 142 is secured within the recessed mount 140 by a number of identical cap screws 146, each threaded through identical radial bores 148 in the cylindrical flange 138 and into a receiving channel 150. In the preferred embodiment, a total of three cap screws 146 are equidistantly space about the central axis CA to retain the stop-out plate 142 within the recessed mount 140, however, one skilled in the art will recognized that greater or fewer numbers of cap screws may be employed within the scope of this invention, and that the receiving channel 150 may be replaced by a number of circumferentially disposed receiving recesses (not shown).

Axially disposed within the bore 116 is a pivot punch 158 having a cylindrical body 160 and a longitudinal bore 162 axially aligned with the central axis CA. A posterior end 164 of the body 160 is configured to contact the housing adapter 104, such that the axial passage 162 is aligned with the axial passage 105 in the housing adapter 104. An anterior end 166 of body 160, has a tapered exterior surface, and is configured to extend through the mounting plate axial passage 136 and partially into the enlarged axial bore 145 of stop-out plate 142.

To provide for a compressive force acting on the pivot punch 158, a die spring 174 is placed concentrically around the body 160 in the bore 116, between the posterior end 164 and the body 127 of the mounting plate 126. When installed within the housing 102, the die spring 174 seats between the mounting plate 126 and an O-ring adapter 167 is seated about the posterior end 164 of the body 160 of pivot punch 158. In the preferred embodiment, the die spring 174 is provided with an 846 lb preload between the O-ring adapter 167 and the mounting plate 126, to maintain the pivot punch 158 in a withdrawn position.

One skilled in the art will recognize that alternate types of compressible spring members, such as helically wound springs may be employed within the scope of the invention, provided the loading requirements are met. By slightly compressing or preloading the die spring 174, an expansion force is directed coaxially along the central axis CA, urging the housing adapter 104 and mounting plate 126 in opposite directions. As is readily apparent from examination of FIGS. 4 an 5, the mounting plate 126 is secured to the cylindrical housing 102, which is in turn seated against a surface of the housing adapter 104. The load on the posterior surface 156 of the mounting plate 126 is transferred to the housing 102 through the countersunk cap screws 128, causing the shoulder 118 of the housing 102 to seat securely against the circumferential flange 122 of the housing adapter 104. The expansion force thereby is seen to hold the housing 102 and associated components against the housing adapter 104.

Continuing to refer to FIGS. 4 and 5, assembly of the two-stage stop-out two-stage assembly tool 100 of the present invention begins with the cylindrical housing 102 and the housing adapter 104. The housing adapter 104 is placed within the housing 102, adjacent the posterior end, such that the circumferential flange 122 on the housing adapter seats against the should 118 of the housing 102. Next, the pivot punch 158 and its associated O-ring washer 167 are seated within bore 116, concentric with the axis CA. The die spring 174 is then placed within the housing bore 116, about the pivot punch 158, such that one end of the die spring 174 seats against the O-ring washer 167.

To enclose the housing 102, the mounting plate 126 is axially aligned with the central axis CA and positioned against the anterior end 124 of the housing 102, compressing the die spring 174 to the predetermined preload. Countersunk cap screws 128 are then threaded into the housing 102 through the mounting plate bores 132, securing the mounting plate in a fixed relationship with the housing and retaining the pivot punch 158 within the housing bore 116 in such a manner to allow for a small degree of axial movement of the pivot punch. All axial movement of the pivot punch 158 is restrained by the die spring 174.

The two-stage assembly tool 100 is next secured to the head adapter 106 by retaining bolts 108 threaded through bore 110 in the flange 112 of the head adapter and into the housing adapter 104. Once secured to the head adapter 106, the axial bore 105 aligns with a corresponding bore in the spin head adapter, permitting the injection of a lubricant through the axial bore 105, and into the axial bore 162 of the pivot punch 158. The final step in assembly the tool 100 is the selection and attachment of the removable stop-out plate 142. As is described in the co-pending U.S. patent application Ser. No. 09/167,917, the removable stop-out plate includes the working face 144 configured to deform a conical or convex cover-plate 66, and accordingly is selected to correspond to the size and shape of the cover-plate. The removable stop-out plate 142 is positioned axially within the recessed mount 140 on the mounting plate 126, and secured thereto by the placement of cap screws 146 threaded through the flange 138 of the mounting plate 126 and into the receiving channel 150 of the stop-out plate 142.

Turning to FIGS. 6A through 6D, the two-stage assembly tool 100 as described above is utilized in the closure operations of a ball-joint 10 as follows. First, the internal components of the ball-joint 10 are stacked within the ball-joint housing 12 as described in the co-pending U.S. patent application Ser. No. 09/167,917, and positioned in axial alignment beneath the two-stage assembly tool 100, previously secured to a hydraulic or pneumatic press (not shown) by the head adapter 106. The initial operation of the two-stage assembly tool is to close the ball-joint as described in the co-pending application. A downward force is exerted by the hydraulic or pneumatic press, moving the working face 144 of the removable stop-out plate 142 into contact with the expanding cover-plate 66. A continued exertion of downward force by the hydraulic or pneumatic press shifts the housing adapter 104 in an axially downward direction relative to the cylindrical housing 102 of the two-stage assembly tool 100, compressing the die spring 174 until the housing adapter 104 contacts the mounting plate 126. The downward force exerted by the press is now transferred directly to the working face 144, and continues until such time as closure of the ball-joint 10 by expansion of the cover-plate 66 is completed as described in the co-pending application. Simultaneously with the exertion of the compression/expansion force on the cover-plate 66, the pivot punch 158 is driven downward by the compression force through the axial bore 145 in the working face, and extends into the central opening 67 of the cover-plate 66.

Figure 6A:
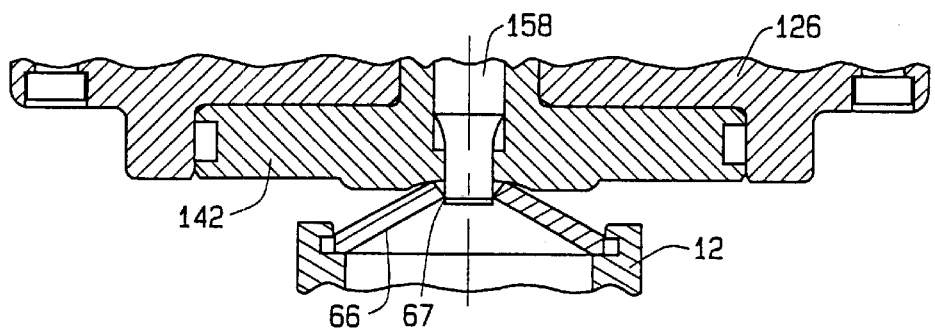
FIG. 6A is an enlarged sectional view of the engagement region in FIG. 5 between the contact surface, pivot punch, and unexpanded cover-plate.
Figure 6B:
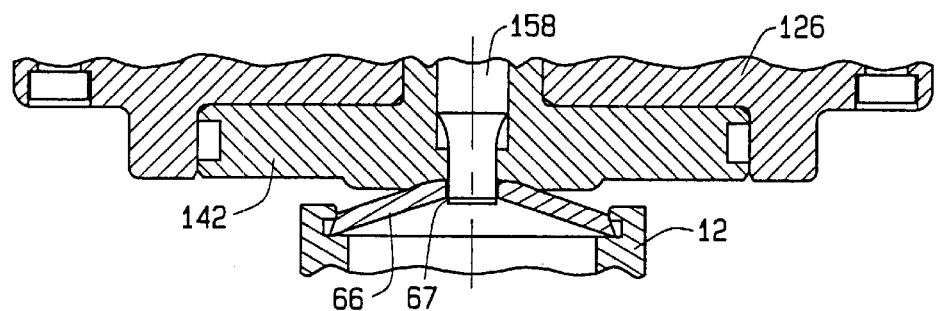
FIG. 6B is a view of FIG. 6A as pressure is exerted against the cover-plate by the contact surface, resulting in engagement between the cover-plate inner edge and the pivot punch.
Figure 6C:
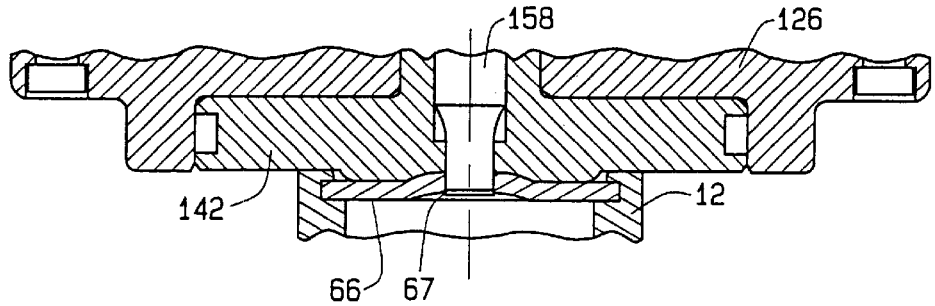
FIG. 6C is a view of FIG. 6A as continued pressure is exerted against the cover-plate by the contact surface, and the engagement between the pivot punch and the inner surface of the cover-plate conforms the cover-plate to the contact surface and into engagement with the housing while establishing a central orifice of predetermine dimensions.
Figure 6D:
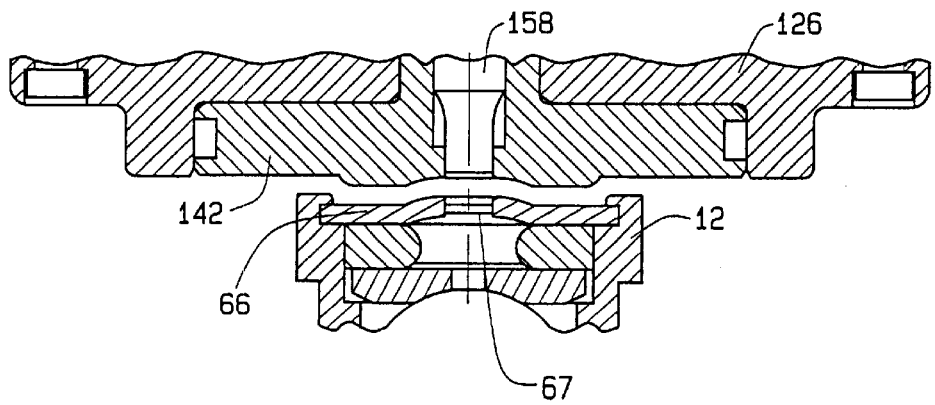
FIG. 6D is a view similar to FIG. 6A, illustrating the closed housing assembly following expansion of the cover-plate and establishment of a central orifice of predetermined dimensions by the tool and method of the present invention.

As best seen in FIGS. 6B–6D, as the cover-plate 66 begins to deform under the compression load from the working face 144, the inner surface of the cover plate central opening 67 contacts the exterior cylindrical surface 166 of the pivot punch. The result is an increased radial load on the cover-plate, causing the cover-plate 66 to deform in such a manner as to conform to the working face 144. Simultaneously, the exterior cylindrical surface 166 of the pivot punch ensures that the central opening 67 in the cover-plate 66 is sized to predetermined dimensions corresponding to those of the pivot punch 158. As seen in FIG. 6C, upon full expansion of the cover-plate 66 and the closure of the ball-joint 10, the working face 144 contacts the upper surface of the counterbore 22 in the ball-joint housing 10, and is blocked from further downward movement. At this point, it is desirable to inject a quantity of lubricant into the closed ball-joint 10 through the axial bore 162 of the pivot punch 158. The lubricant exits the pivot punch 158 at anterior end, adjacent the cylindrical surface 166, below the now closed cover-plate 66.

Upon completion of the deformation of the expanded cover-plate 66 by the pivot punch 158, and the injection of the lubricant, the load is withdrawn from the two-stage assembly tool 100, permitting die spring 174 to axially retract the pivot punch 158 within the cylindrical housing 102, and the removal of the two-stage assembly tool 100.

Those skilled in the art will recognize that the die spring load requirements, the final deformation shape of the expanded cover-plate 66, and the sizing of the cove-plate central bore 67 to receive a self-tapping or threaded grease fitting may be adjusted as required to achieve alternative deformations of the cover-plate 66 factoring material composition and component sizes.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for enclosing one end of a movable socket within a housing with an expandable cover-plate having a central orifice configured to receive a grease fitting, and simultaneously establishing said central orifice to predetermined dimensions to receive said grease fitting, comprising the steps of:

assembling internal components of said movable socket within said housing, with said expandable cover-plate disposed over said internal components;

positioning a two-stage assembly tool in axial alignment along a central axis with said expandable cover-plate;

exerting a load on said two-stage assembly tool such that a working face of said two-stage assembly tool moves along said central axis to contact said expandable cover-plate, and a concentrically disposed pivot punch extends to seat within said central orifice;

increasing said exerted load to axially displace said working face into contact with said housing, displacement of said working face and said pivot punch expanding said expandable cover-plate into conformance with said working face, enclosing said internal components within said housing of said movable socket, and establishing said central orifice to predetermined dimensions corresponding to said pivot punch; and releasing said exerted load to remove said pivot punch from said central orifice and said working face from contact with said movable socket.

2. The method of claim 1 wherein increasing said exterted load on said two-stage assembly tool compresses a spring member disposed within said two-stage assembly tool, transferring said exerted load to said working face and said pivot punch.

3. The method of claim 2 wherein releasing said exerted load to remove said pivot punch from said central orifice results in said spring member expanding to axially retract said pivot punch.

4. The method of claim 1 wherein expansion of said cover-plate into conformation with said working face is controlled by said pivot punch engaging an inner surface of said central orifice in said cover-plate.

5. The method of claim 1 wherein said pivot punch prevents said cover-plate from collapsing into a downward concave configuration during said expansion step.

6. The method of claim 1 wherein prior to the step of releasing said exerted load to remove said pivot punch from said central orifice and said working face from contact with said movable socket, further including the step of injecting a lubricant into said movable socket through an axial bore in said pivot punch.

* * * * *